United States Patent Office 3,597,371
Patented Aug. 3, 1971

3,597,371
POLYURETHANE FOAMS BASED ON ALKYLENE OXIDE ADDUCTS OF ALKYLENE-BIS-PHENYL-ENE DIAMINES
J. W. Britain, New Martinsville, W. Va., assignor to Mobay Chemical Company, Pittsburgh, Pa.
No Drawing. Continuation of application Ser. No. 613,087, Feb. 1, 1967, which is a continuation-in-part of application Ser. No. 452,898, May 3, 1965, which in turn is a continuation-in-part of application Ser. No. 54,546, Sept. 7, 1960. This application June 5, 1969, Ser. No. 833,875
Int. Cl. C08g 22/08, 22/44
U.S. Cl. 260—2.5AQ
6 Claims

ABSTRACT OF THE DISCLOSURE

Polyurethane foams made by reacting an organic polyisocyanate in the presence of a blowing agent with an alkylene oxide adduct of alkylene-bis-phenylene diamines.

---

This invention relates to the preparation of new synthetic resins and more particularly, to a method of making a novel resinous product for use in making a polyurethane foam and is a continuation of co-pending application Ser. No. 613,087, filed Feb. 1, 1967, now abandoned, which is a continuation-in-part of copending application Ser. No. 452,898, filed May 3, 1965, now U.S. Pat. 3,336,245, which is in turn a continuation-in-part of application Ser. No. 54,546, now abandoned.

It has been proposed heretofore to prepare polyurethane foams by reacting an organic polyisocyanate with an organic compound having at least two reactive hydrogen atoms such as, for example, a polyester, a polyalkylene ether glycol, or the like. It also has been proposed to use compounds having at least three hydroxyl groups such as, for example, the condensation product of propylene oxide and a trihydric alcohol such as trimethylolpropane. For example, Price in U.S. Patent 2,866,774 discloses that a foam can be prepared from the reaction product of an organic polyisocyanate and a polyalkylene ether having three or more hydroxyl groups by adding water to the reaction product. Such a process is disadvantageous because the components are mixed together in two steps and because the product is not entirely suitable for filling cavities due to lack of dimensional stability and cost of manufacture.

It has also been proposed to prepare polyurethane foams by reacting an organic diisocyanate with a polypropylene ether glycol under substantially anhydrous conditions to form a prepolymer and then reacting the resulting prepolymer with water and N,N,N',N' - tetrakis (2-hydroxy propyl) ethylene diamine. This process is disclosed in U.S. Pat. 2,915,496 and is a costly two-step process.

The products of such reactions have many uses, but it has been found that rigid foams prepared from such products or from other alkylene oxide-aliphatic amine condensates are not entirely suitable for filling cavities because they have poor dimensional stability. Methods for filling cavities with polyester foams blown with carbon dioxide have been disclosed such as, for example, in U.S. Pat. 2,690,987 but the foam thus produced is not dimensionally stable, and such foam is too costly to successfully compete with other plastic foams.

It is therefore an object of this invention to provide a method for making improved polyurethane foams devoid of the foregoing disadvantages.

Another object of the invention is to provide a method for making rigid foams less subject to shrinkage and therefore more suitable for filling cavities.

A further object of the invention is to provide a novel resin, a method for making it and a method for making a rigid polyurethane foam therefrom having improved dimensional stability which can be used to advantage for insulation and for preparing molded objects.

A more specific object of the invention is to provide a method for filling cavities with a polyurethane foam which has improved dimensional stability and which retains its shape to a greater degree under humid conditions.

Still another object of this invention is to provide a novel resin which is particularly suitable for making polyurethane foams having good char forming characteristics.

Yet another object of this invention is to provide a unique resin suitable in the preparation of relatively flame resistant polyurethane foam.

The foregoing objects and others are accomplished in accordance with this invention, generally speaking, by providing a method for making a solidified polyurethane foam which involves reacting an organic polyisocyanate with a unique substituted aromatic polyamine containing a single molecule of an alkylene oxide for each hydrogen atom of the amino groups which has been replaced. Generally, the method for making the polyurethane foam includes reacting an organic polyisocyanate in the presence of a blowing agent with a compound having the formula

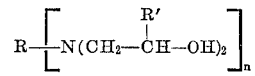

wherein R' is either hydrogen or an alkyl radical having from 1 to about 3 carbon atoms; n is an integer of from 2 to 5 and R is a radical having a valence equal to n and obtained by removing n hydrogen atoms from the grouping:

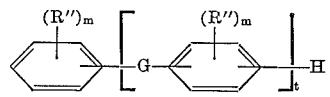

and mixtures thereof, in which R" is halogen, an alkyl radical having from 1 to 4 carbon atoms or an alkoxy radical having from 1 to 4 carbon atoms; G is an alkylene radical having from 1 to 3 carbon atoms; m is an integer of from 0 to 4 and t is an integer of from 1 to 4.

It is essential for most rapid uniform mixing of the reactants that the resinous material being reacted with the polyisocyanate have a viscosity of not substantially more than about 75,000 centipoises at 25° C.; for that reason, the addition product of the polyamine must either have such a viscosity or its viscosity must be reduced to this point by mixing it with another resinous organic compound having at least two reactive hydrogens and a lower viscosity to insure best mixing characteristics.

The alkylene oxide polyamine condensates of this invention are especially advantageous in the production of polyurethane foams because of their high degree of compatibility with foaming resins including polyethers, polyesters and the like. It had been found that similar alkylene oxide condensates of many amines were often, if not always, incompatible to a certain extent with the foaming resins to be used in the production of a polyurethane foam. Hence, it was quite surprising to discover that the aromatic polyamine alkylene oxide condensates of this invention do not suffer from this disadvantage to as great an extent as is entailed with the use of the other condensates. Further, the polyurethane foams obtained when using the aromatic polyamine-alkylene oxide condensates of this invention have a higher heat distortion temperature than do foams in which these condensates are not used. Thus, due to the overall higher heat distortion temperature of these foams, one is able to heat them without causing the high degree of change in shape that is encountered when heating other foams which do not include these types of condensates. This is particularly true with the higher functional, higher polyarylene condensates of this invention. This effect may also be due in some measure to the fact that the condensates of this invention are more compatible with foam systems than other similar adducts.

However, perhaps the most important advantage of the aromatic polyamine-alkylene oxide condensates of this invention is the fact that they impart a degree of flame retardancy to the foams in which they are utilized. As a consequence, the foams containing the aromatic polyamine-alkylene oxide condensates of this invention are excellent char formers. In other words, rather than burning up or bursting into flame, the foams prepared from the adducts of this invention form a char when continually subjected to a flame. This is particularly true when the alkylene oxide adduct of crude 4,4'-diphenylmethane diamine is used and most especially when triaryldimethylene triamino alkylene oxide condensates are used. Furthermore, whether the alkylene oxide adducts of this invention are used alone or in combination with a suitable diluent as described herein, the unexpected advantages inherent in their use are still obtained.

The condensate of the aromatic polyamine and the alkylene oxide may be produced by any known method. The manipulative steps disclosed in U.S. Pat. 2,174,762, for example, may be used; another suitable process is that disclosed in U.S. Pat. 2,257,817. The method used to prepare the aromatic diaminepropylene oxide condensates of Example 1 herein is preferred, however, and a method for making a foam wherein the aromatic diamine-propylene oxide condensate is prepared and then reacted without extensive purification steps to form a foam is also preferred. The resulting foam product has good dimensional stability and can be made with less cost since purification to remove isomers is avoided.

The conditions under which the propylene oxide and the aromatic diamine are reacted may be varied from those set forth in the example referred to, however. For example, the temperature can vary from about 80° C. up to about 250° C. or even higher. The pressure can also be varied but it has been found that best results are obtained when the pressure is within the range of from about 1 to about 3 atmospheres gauge pressure at a temperature of from 100° C. to about 170° C. Although it is not necessary to use a catalyst in the preparation of the aromatic polyamine-propylene oxide condensates, the reaction proceeds at a more rapid rate if one is used. Any suitable basic catalyst can be used but it is preferred to use an alkali metal catalyst such as, for example, metallic sodium or potassium. Any catalytic amount of the catalyst can be used but it is preferred to use from about 0.01 percent to about 1 percent by weight thereof, in which case an acid chloride such as benzoyl chloride should be added after reaction has completed to neutralize all of the catalyst in order to obtain best results.

Any suitable polyamine may be used to prepare the addition product of this invention including polyaryl polyalkylene polyamines having the formula

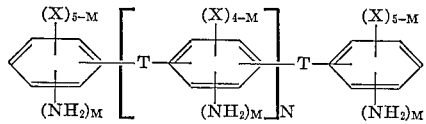

in which T is an organic radical and preferably an aliphatic radical obtained by removing the carbonyl oxygen from an aldehyde or ketone and is preferably —$CH_2$—, M is 1 or 2, X is halogen, lower alkyl, lower alkoxy or hydrogen and N is 0, 1, 2, or 3. The aliphatic radical, T, in the foregoing formula, may be obtained by removing the carbonyl oxygen from any suitable aldehyde or ketone such as, for example, from formaldehyde, acetaldehyde, propionaldehyde, butyraldehyde, N-heptaldehyde, benzaldehyde, cyclohexane, aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $CH_3$—CO—$CH_3$, the radical remaining is

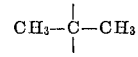

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl alkylene polyamines are preferably mixtures of di- and higher polyamines. Thus, N in the formula preferably has a value of from about 0.1 to about 1.5. To illustrate, in a preferred mixture of amines of the above formula wherein M is 1 and X is hydrogen containing 90% diamine and 10 percent triamine, N has a value of 0.1. For a preferred mixture containing 20 percent di-, 30 percent tri-, 30 percent tetra- and 20 percent penta-amine, the average value of N would be 1.5. A most preferred value for N is between about 0.85 and about 1.1 with about 40 percent to about 60 percent of the mixture of polyamines being a diamine.

Amines of the above formula are well-known and available commercially. They may be prepared as disclosed in U.S. Pat. 2,683,730. A specific amne suitable for use in accordance with the present invention may be obtained by reacting about 60 parts of aniline with about 25 parts of formaldehyde (aqueous, 37 percent $CH_2O$) and about 74 parts of HCl (aqueous, 30 percent HCl) at a temperature of about 90° C. to about 100° C. for about 1.5 to about 2 hours and then reacting this product with NaOH and separating out the crude amine which has the following composition:

About 65.5% is difunctional and consists of about 1.2% of the isomer:

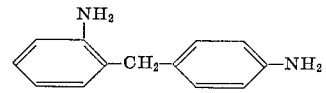

and about 64.3% of the isomer:

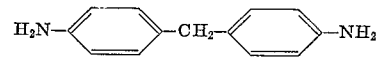

About 14.5% is trifunctional and consists of the isomer:

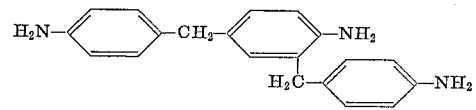

About 7.0% is tetrafunctional and consists of the isomers:

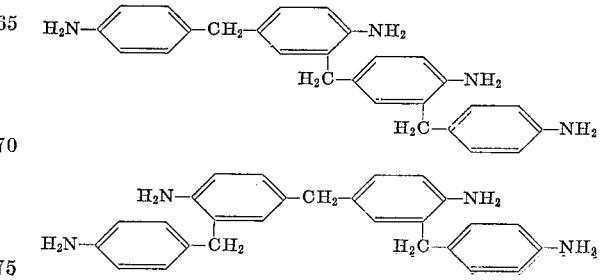

and

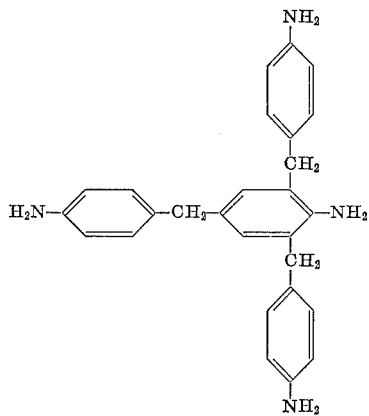

and about 13.0% is made up of pentafunctional and higher isomers having a structure similar to that of the tetrafunctional isomers.

One particularly preferred aromatic diamine is 4,4'-diphenylmethane diamine. The polyamine may be a chemically pure product or it can be a so-called crude diamine which contains various isomers in admixture with one another as above described. Any other suitable polyamine may also be used such as, for example,
4,4'-diamino-3,3'-dichlorodiphenyl methane,
4,4'-diamino-3,3'-dimethyldiphenyl methane,
4,4'-diamino-3,3'-dimethoxydiphenyl methane,
4,4'-diamino-diphenyl dimethyl methane,
4,4'2-triamino-3,3'-dimethyldiphenyl methane,
3,3'-diisopropoxy-4,4'-diaminodiphenyl methane,
3,3'-diethyl-4,4'-diaminodiphenyl methane,
3,3'-dipropyl-4,4'-diaminodiphenyl methane,
3,3'-dibutyl-4,4'-diaminodiphenyl methane,
3,3'-diisobutyl-4,4'-diaminodiphenyl methane,
3,3'-diisopropoxy-4,4'-diaminodiphenyl ethane,
3,3'-dimethyl-4,4'-diaminodiphenyl ethane,
3,3'-diethyl-4,4'-diaminodiphenyl ethane,
3,3'-dipropyl-4,4'-diaminodiphenyl ethane,
3,3'-dibutyl-4,4'-diaminodiphenyl ethane,
3,3'-diisopropyl-4,4'-diaminodiphenyl ethane,
3,3'-diisobutyl-4,4'-diaminodiphenyl ethane,
3,3'-dimethoxy-4,4'-diaminodiphenyl ethane,
3,3'-diisopropoxy-4,4'-diaminodiphenyl propane,
3,3'-dimethyl-4,4'-diaminodiphenyl propane,
3,3'-diethyl-4,4'-diaminodiphenyl propane,
3,3'-dipropyl-4,4'-diaminodiphenyl propane,
3,3'-dibutyl-4,4'-diaminodiphenyl propane,
3,3'-diisopropyl-4,4'-diaminodiphenyl propane,
3,3'-diisobutyl-4,4'-diaminodiphenyl propane,
3,3'-dimethoxy-4,4'-diaminodiphenyl propane,
3-methyl-3'-ethyl-4,4'-diaminodiphenyl methane,
3-methyl-2'-ethyl-4,4'-diaminodiphenyl ethane,
2-chloro-3'-methoxy-4,4'-diaminodiphenyl ethane,
3-propoxy-3'-bromo-4,4'-diaminodiphenyl ethane,
3-methyl-3'-ethyl-4,4'-diaminodiphenyl propane,
3-methyl-2'-ethyl-4,4'-diaminodiphenyl propane,
2-chloro-3'-methoxy-4,4'-diaminodiphenyl propane,
3-propoxy-3'-bromo-4,4'-diaminodiphenyl propane,
3-methyl-5-ethyl-4,4'-diaminodiphenyl methane,
3-methyl-5-ethyl-4,4'-diaminodiphenyl ethane,
3-methyl-5-ethyl-4,4'-diaminodiphenyl propane,
3,5,3'-tripropyl-4,4'-diaminodiphenyl methane,
3,5,3'-trimethoxy-4,4'-diaminodiphenyl methane,
3,5,3'-trichloro-4,4'-diaminodiphenyl methane,
3,5,3'-tripropyl-4,4'-diaminodiphenyl ethane,
3,5,3'-trimethoxy-4,4'-diaminodiphenyl ethane,
3,5,3'-trichloro-4,4'-diaminodiphenyl ethane,
3,5,3'-tripropyl-4,4'-diaminodiphenyl propane,
3,5,3'-trimethoxy-4,4'-diaminodiphenyl propane,
3,5,3'-trichloro-4,4'-diaminodiphenyl propane,
2-bromo-3-propoxy-3'-methyl-4,5'-diaminodiphenyl methane,
2-bromo-3-propoxy-3'-methyl-4,5-diaminodiphenyl ethane,
2-bromo-3-propoxy-3'-methyl-4,5'-diaminodiphenyl methane,
2-chloro-3-methoxy-3'-ethyl-4,5'-diaminodiphenyl ethane,
2-chloro-3-methoxy-3'-ethyl-4,5'-diaminodiphenyl propane, and
the like and mixtures thereof.

Hence, as indicated above, any of the polyamines may contain substituents on the aromatic nucleus in addition to the amino groups; however, space prohibits a mention of the multitude of operative polyamines and substituted polyamines which may be used. All aromatic polyamines falling within the above-defined categories are contemplated.

Any suitable alkylene oxide, preferably one having 2 to 5 carbon atoms, such as, for example, ethylene oxide, propylene oxide, butylene oxide and amylene oxide may be condensed with the aromatic polyamine to form the addition product. Likewise, the polyamine can be condensed with an alkylene halohydrin such as, for example, ethylene chlorohydrin, propylene chlorohydrin, epichlorohydrin, and the like.

The condensate produced from a diamine, for example, should have four hydroxyl groups. In other words, all of the hydrogen atoms on the nitrogen atoms of the polyamine should be replaced with an hydroxyl terminated alkylene radical. The invention thus contemplates any addition product of an aromatic polyamine having at least four hydroxyl groups and a molecular weight of at least about 364 which is the theoretical molecular weight of the condensation product of 1 mol of 4,4'-diphenylmethane diamine and 4 mols of ethylene oxide. The hydroxyl number of the addition product of the polyamine and alkylene oxide can vary from about 400 to about 650 but is preferably from about 595 to about 600.

Although a foam can be prepared to advantage from alkylene oxide-aromatic polyamine condensates of any molecular weight the most consistently good results have been obtained up to this time with an adduct of 4 mols of propylene oxide and 1 mol of 4,4'-diphenylmethane diamine. The product of 1 mol of 4,4'-diphenylmethane diamine and 4 mols of propylene oxide can be represented by the formula:

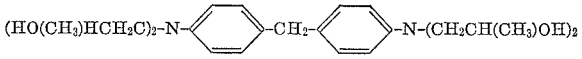

When the viscosity of the polyamine/alkylene oxide condensate exceeds operable limits, that is, above about 75,000 centipoises, its viscosity must be adjusted with a suitable diluent. This is accomplished by mixing the polyamine/alkylene oxide condensate with another resinous organic compound having at least two reactive hydrogen atoms and a lower viscosity. In fact, one of the preferred embodiments of the invention contemplates a mixture of the polyamine/alkylene oxide addition product of this invention and another resin, such as, for example, a polyester, a polyhydric poly(alkylene ether), a polyhydric poly(alkylene thioether) or other suitable organic compounds having at least two and preferably not more than six reactive hydrogen atoms and a molecular weight of from about 100 to about 1,500, an hydroxyl number of from about 75 to about 1,700 and a viscosity at 25° C. of from about 100 centipoises to about 5,000 centipoises. The polyalkylene ether or similar compound having at least two reactive hydrogen atoms used in admixture with the addition product of an aromatic polyamine and an alkylene oxide must be miscible with the addition product in all proportions in which it is to be used.

The amount of organic compound having at least two reactive hydrogen atoms used as a diluent to reduce the viscosity of the resinous component will vary with the viscosity of the aromatic polyamine-alkylene oxide addition product and the viscosity of the diluent. For best results however, the mixture should contain from about 90 parts by weight to about 50 parts by weight of the addition product of the polyamine and about 10 parts by weight to about 50 parts by weight of the other organic compound having at least two reactive hydrogen atoms. Preferably, the ratio of polyamine-alkylene oxide addition product or adduct to the other organic compound having at least two reactive hydrogen atoms will be from about 65 to about 70 parts of the former to about 35 to about 30 parts of the latter (diluent).

Any suitable organic compound having at least two reactive hydrogen atoms determinable by the Zerewitinoff method may be used as the diluent. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including aromatic, aliphatic and heterocyclic diamines, triamines, tetramines and the like; as well as mixtures thereof. Compounds which contain two or more different groups within the above-defined classes may also be used in accordance with the process of the present invention such as, for example, amino alcohols which contain an amino group and a hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

Any suitable hydroxyl polyester including lactone polyesters may be used, for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid; alpha, beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid; 3,4,9,10-perylenetetracarboxylic acid and the like. Any suitable polyhyldric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth herein or they may be made using the same components that make up the hydroxyl polyester with only a portion of the components being a diamine such as ethylene diamine and the like.

Any suitable polyhydric polyalkylene ether may be used such as, for example, the condensation product of an alkylene oxide beginning with any suitable initiator. The initiator may be a difunctional compound, including water, so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator, including as such amines, alcohols and the like, have from 2 to 8 active sites to which the alkylene oxides may add. Any suitable alkylene oxide may be used such as, for example, ethylene oxide, propylene oxide, butylene oxdie, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms and the like. Phosphorous acids may also be used as initiators, but the phosphorous compounds are somewhat peculiar and require different modes of preparation as more particularly set forth below. The resulting polyhydric polyalkylene ethers with the various bases of nitrogen, phosphorus and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per funnctional group of the initiator. There are many suitable processes for the preparation of polyhydric polyalkylene ethers including U.S. Pats. 1,922,459; 3,009,939 and 3,061,625 or by the process disclosed by Wurtz in 1859 and discussed in the Encyclopedia of Chemical Technology, Volume 7, pages 257 to 262, published by Interscience Publishers, Inc. (1951).

Specific example of initiators are water, ethylene glycol, propylene glycol, glycerine, trimethylol, propane, pentaerythritol, arabitol, sorbitol, maltose, sucrose, ammonia, diethanolamine, triethanolamine, dipropanolamine, tripropanolamine, diethanolpropanolamine, tributanolamine, 2,4 - toluene diamine, 4,4' - diphenylmethane diamine, p,p',p'' - triphenylmethane triamine, ethylene diamine, propylene diamine, propylene triamine, N,N,N',N'-tetrakis-(2-hydroxypropyl) ethylene diamine, diethylene triamine and the like. The phosphorus containing polyols are more fully described below.

Any suitable polyhydric polythioether may be used such as, for example, the condensation product of thiodiglycol or the reaction product of a polyhydric alcohol, such as are disclosed herein for the preparation of the hydroxyl polyesters, with any other suitable thioetherglycol. Other suitable polyhydric polythioethers are disclosed in U.S. Pats. 2,862,972 and 2,900,368.

Any suitable polyacetal may be used such as, for example, the reaction product of formaldehyde or any other suitable aldehyde with a polyhydric alcohol such as those disclosed herein for the preparation of the hydroxyl polyesters.

Any suitable aliphatic polyol may be used such as, for example, alkane diols including, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol, 1,20-eicosane diol and the like; alkene diols such as, for example 1-butene-1,4-diol, 1,3-butadiene-1,4-diol, 2-pentene-1,5-diol, 2-hexane-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3-6-hexane trithiol and the like; alkene thiols such as, for example, 2-butene- 1,4-dithiol and the like; alkyne thiols such as, for example, 3-hexyne-1,6-dithiol and the like.

Any suitable polyamine may be used including, for example, aromatic polyamines such as p-amino aniline, 1,5-diamino naphthalene, 2,4-diamino toluene, 1,3,5-benzene triamine, 1,2,3 - benzene triamine, 1,4,5,8 - naphthalene tetramine and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole and the like.

Phosphorus containing compounds are often advantageously used because of the flame retarding effect which they impart to the resulting plastics. These compounds often contain 1 or 2 phosphorus atoms as a nucleus and then have alkylene oxide side chains bonded to the phosphorus nucleus through either phosphate or phosphite type linkages. The phosphate compounds are advantageously prepared by condensing a mixture of phosphorus peentoxide and water with an alkylene oxide. It is advantageous to use mixtures of phosphorus pentoxide and water which correspond to about 80 percent phosphorus pentoxide and about 20 percent water, but any amount within the range of about 65 percent to 90 percent phosphorus pentoxide and the balance water may be used, the whole range being contemplated. The phosphites are advantageously prepared in accordance with the method of U.S. Pat. 3,009,929 where triphenyl phosphite, for example, is reacted with a polypropylene ether glycol to prepare a product having a molecular weight of about 500; other suitable processes are also disclosed in the patent. It is also possible to use polyethers based on phosphorus which contain nitrogen atoms in addition to the phosphorus atoms. These compounds may be represented by the general formula

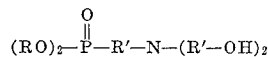

wherein R is phenyl or a lower alkyl group such as, for example, methyl, ethyl, propyl, butyl and the like and R' is an alkylene radical which preferably contains from 1 to 4 carbon atoms such as, methylene, ethylene, 1,2-propylene, 1,4-butylene and the like; a preferred compound is dioxyethylene-N,N-bis-(2-hydroxyethyl) aminomethyl phosphonate.

Any of the compounds of any of the classes set forth hereinbefore may also contain other substituents including halogen atoms such as, for example, chloro, bromo, iodo and the like; nitro groups; alkoxy radicals such as, for example, methoxy, ethoxy, propoxy, butoxy and the like; carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and the like groups.

The polymer of tetrahydrofuran, hydrogenated castor oil and the polymer of an olefin such as ethylene and carbon monoxide have been used in preparing polyurethanse heretofore and can be used as the diluent in practicing the herein-described invention. Suitable polymeers of olefins and carbon monoxide are disclosed in U.S. Pat. 2,839,478.

As used herein, the term "resinous component" of the reaction mixture is a resin containing the addition product of an aromatic polyamine and an alkylene oxide either alone or in admixture with another organic compound having reactive hydrogens.

In the preparation of a cellular polyurethane from the unique condensates of this invention, an amount of polyisocyanate at least stoichiometrically equivalent to the reactive hydrogen atoms of the condensate should be used for best results, although an excess of up to about 2.5 NCO groups per reactive hydrogen atom or even more can be used. Where the condensate is being used in admixture with an organic compound containing at least two hydrogen atoms which are reactive with NCO groups as a diluent, the amount of polyisocyanate should be increased accordingly.

Any suitable organic polyisocyanate including aliphatic polyisocyanates, acyclic polyisocyanates, alicyclic polyisocyanates, and heterocyclic polyisocyanates may be used but best results are obtained with aromatic polyisocyanates, and they are preferred. Arylene diisocyanates are most preferred. For example, one may use the polyisocyanates disclosed in Reissue Pat. 24,514 including hexamethylene disisocyanate, 2,6 - tolylene diisocyanate, 2,4-tolylene diisocyanate, a mixture of about 80 percent 2,4-tolylene diisocyanate and 20 percent 2,6-tolylene diisocyanate, 4,4' - diphenyl methane diisocyanate, 4,4'-diphenyl dimethyl methane diisocyanate, 1,5-naphthalene diisocyanate, 1-methyl - 2,4 - diisocyanato-5-chlorobenzene, 2,4 - diisocyanato - s - triazine, 1 - methyl-2,4-diisocyanato cyclohexane, p-phenyl diisocyanate, 1,4-naphthalene diisocyanate, 4,4',4'' - triphenyl methane triisocyanate, the urea diisocyanates including those disclosed in U.S. Pat. 2,757,185, and the dimers, trimers and other polymers of polyisocyanates, and the like.

It has been discovered that particularly in the production of a rigid polyurethane foam, a foam having a greater dimensional stability than the foams obtained with one of the foregoing substantially chemically pure polyisocyanates can be obtained from crude 2,4 - tolylene diisocyanate and 2,6 - tolylene diisocyanate. When tolylene diisocyanate is produced by conventional phosgenation of the corresponding diamine, a product containing about 90 percent 2,4- and 2,6-tolylene diisocyanate is obtained from the phosgenator. This product is then usually subjected to fractionation to remove any tolylene diamine or other impurities from the product. The ordinary refined commercial grade of an 80 percent 2,4-tolylene diisocyanate and 20 percent 2,6-tolylene diisocyanate mixture contains at least 99 percent of these isomers. It was found that a 4" x 4" x 1" block of foam prepared from such refined 80 percent 2,4- and 20 percent 2,6-tolylene diisocyanate shrank in storage at 158° F. with a relative humidity of 100 percent to 90 percent of its original volume in 11 days. A similar block of foam prepared by an identical process and with the same chemicals except that an unrefined 80 percent 2,4-tolylene diisocyanate and 20 percent 2,6-tolylene diisocyanate (about 91 percent tolylene diisocyanate) was used did not shrink to 90 percent of its original volume until after 13 days exposure to 100 percent relative humidity at 158° F. It is therefore preferred to prepare a rigid foam according to this invention from an aromatic polyamine-alkylene oxide adduct and crude 2,4-tolylene diisocyanate and 2,6-tolylene diisocyanate mixtures. The two most preferred formulations for making rigid foam in accordance with this invention include one containing a condensate of 4 mols of propylene oxide with 1 mol of 4,4'-diphenylmethane diamine and 4,4'-diphenylmethane diisocyanate and another containing a condensate of 2 mols of propylene oxide per amino group of one mol of crude 4,4'-diphenylmethane diamine described herein as containing about 65.5% of diarylmethylene diamine, about 14.5 percent of triaryldimethylene triamine, about 7 percent of tetraaryltrimethylene tetraamine and about 13 percent of a mixture of higher polymers of the reaction and a mixture of the corresponding isocyanate which thus includes about 65.5 percent of diarylmethylene diisocyanate, about 14.5 percent of triaryldimethylene triisocyanate, about 7 percent of tetraaryltrimethylene tetraisocyanate and about 13 percent of a mixture of higher polymeric isocyanates. In the latter formulation, both the isocyanate and the amine are crude reaction products obtained by reacting aniline with formaldehyde and, in the case of the isocyanate, thereafter subjecting the crude reaction mixture to a phosgenation reaction.

Polyurethane foams can be prepared in accordance with this invention easily by a one-shot process in which the resinous component, the polyisocyanate and the blowing agent are mixed together substantially simultaneously. Any suitable apparatus such as the one disclosed in Reissue Pat. 24,514 may be used. A one-shot process is preferred over a prepolymer process although it is possible to prepare the foam in two steps if the resinous component is reacted first under substantially anhydrous conditions with an organic polyisocyanate to form a prepolymer which is then reacted with water or mixed with another blowing agent to form the foam in a second step.

Any suitable material which will emit a gas which can be entrapped in the polyurethane causing it to expand may be used as the blowing agent. Therefore, the blowing agent can be carbon dioxide produced in the reaction mixture through reaction of water with —NCO groups or it can be in the reaction mixture in the form of an added inert gas, such as, for example, nitrogen, carbon dioxide, air, argon or the like. Trichlorofluoromethane, or a similar organic compound which is a gas at the reaction temperature of about 75° C. or less can be used. A mixture of carbon dioxide produced by reaction of water with

—NCO groups in the reaction mixture and trichlorofluoromethane, dichlorodifluoromethane, difluorochloroethane, difluorobromoethane, difluorodibromomethane, difluorodichloroethane, difluoro - 1,2 - dichloroethylene, trifluorotrichloroethane, diethyl ether, methylene chloride, or similar material may be used but it is preferred to use trichlorofluoromethane or the like, particularly if the foam is to be used as an insulator, such as, for example, in the wall of a refrigerator. Pentane, hexane or similar hydrocarbons having a boiling point of 75° C. or less may be used. It has been found that the insulating properties of a foam produced when trichlorofluoromethane is used as the blowing agent are better than when carbon dioxide or the like is used alone. If the rigid foam is to be used where maximum strength is important, it is preferred to use carbon dioxide either by addition thereof as a gas to the reaction mixture or by forming it in situ in the reaction mixture. Therefore, any suitable inert compound which is a gas at the reaction temperature can be used. Such inert gases and the manipulative steps required for using them are known and the selection of the blowing agent does not form part of this invention.

It is sometimes possible to conduct the reaction to prepare a polyurethane without any catalyst being present, particularly if the polyamine-alkylene oxide adduct contains a high percentage of —OH and/or contains tertiary nitrogen. However, small amounts of catalyst may be used to advantage in some reaction mixtures. Consequently, the invention contemplates either a polyurethane reaction mixture containing no catalyst or a polyurethane reaction mixture containing any catalytic amount of any suitable catalyst. Some such suitable catalysts may be any suitable tin compound such as, for example, stannous chloride, stannous octoate, stannous oleate or any other stannous salt of a carboxylic acid having from 1 to 18 carbon atoms; a dialkyl tin salt of a carboxylic acid having from 1 to 18 carbon atoms such as, for example, dibutyl tin di(2-ethyl hexoate), dibutyl tin dilaurate, or the like; dibutyl tin dibutoxide, dimethyl tin oxide, dibutyl tin sulfide or any other dialkyl tin oxide or dialkyl tin sulfide and the like. Any suitable tertiary amine may be used either in admixture with the tin compound or alone as a catalyst. Some such suitable tertiary amines are disclosed in Reissue Pat. 24,514 and include for example, triethylene diamine, N-ethyl morpholine, N-methyl morpholine, tetramethyl-1,3-butane diamine, triethyl amine, 1-methyl-4-(dimethyl amino ethyl) piperazine, and the like. Although any catalytic amount of catalyst is contemplated in those embodiments using a catalyst, it is preferred to use from about 0.01 to about 1 part by weight of the tin compound per 100 parts by weight of the resinous component, i.e., the polyamine adduct plus the diluent, or from about 0.1 to about 5 parts by weight of a tertiary amine per 100 parts of the resinous component of the reaction mixture. Best results are obtained when the amount of the tin catalyst is from about 0.05 to about 0.3 part by weight per 100 parts resin, so this amount is most preferred. For the tertiary amine, the best results are obtained when the amount of tertiary amine is from about 0.2 to about 1 part by weight per 100 parts resin so this amount is most preferred.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil including, for example, a polydimethyl siloxane or an alkyl silane polyoxyalkylene block copolymer; the latter type of silicone oil is disclosed in U.S. Pat. 2,834,748. When polyhydric polyalkylene ethers are used in the preparation of a cellular polyurethane plastic, it is preferred to employ a silicone oil such as one of those defined in the above patent which comes within the scope of the formula

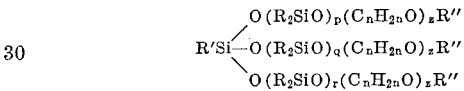

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. The most preferred compound is one having the formula

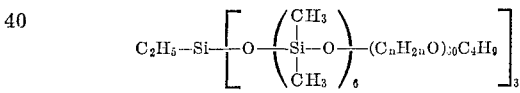

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pats. 668,537, 668,478 and 670,091, and may therefore have the formula $$(R')(SiO_3)_x(R_2SiO)_y[(C_nH_{2n}O)_zH]_a[R''']_{3x-a}$$

where $x$ is an integer and represents the number of trifunctional silicone atoms bonded to a single monovalent or polyvalent hydrocarbon radical R'; $a$ is an integer having a value of at least 1 and represents the number of polyoxyalkylene chains in the block copolymer; $y$ is an integer having a value of at least 3 and denotes the number of difunctional siloxane units; $n$ is an integer from 2 to 4 denoting the number of carbon atoms in the oxyalkylene group; and $z$ is an integer having a value of at least 5 and denotes the length of the oxyalkylene chain. It is to be understood that such compositions of matter are mixtures of block copolymers wherein $y$ and $z$ are of different values and that any method for determining the chain length of the polysiloxane chains and the polyalkylene chains can only give values which represent average chain lengths. In the above formula, R represents monovalent hydrocarbon radicals, such as alkyl, aryl or aralkyl radicals and the polyoxyalkylene chain terminates with a hydrogen atom; R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer, when $x$ in the above formula is one, may be postulated as follows:

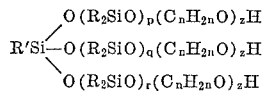

where $p+q+r$ has a minimum value of 3, the other subscripts being the same as in the immediately foregoing formula. In this instance, all three of the oxyalkylene chains are joined to the end of polysiloxane chains of the type $(R_2SiO)$. Specifically, one could use

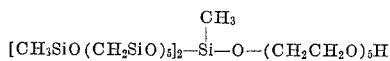

The concentration of the stabilizer can vary over a relatively wide range but preferably it will lie within the range of from about 0.01 to about 3 parts by weight per 100 parts of the resinous components. Most preferably, the amount of stabilizer is about from 0.5 to 1.0 part by weight per 100 parts of the resinous component of the polyurethane reaction mixture.

The polyurethane foam product provided by this invention is particularly suitable for use in filling cavities with insulation and for molding rigid foam objects due to its improved dimensional stability. For example, the product of this invention can be used to advantage for making a wall panel, for filling the cavity of a refrigerator door, or the like.

The invention is further illustrated but is not intended to be limited by the following examples in which all parts and percentages are by weight unless otherwise specified.

EXAMPLE 1

About 1753 parts of 4,4′-diphenyl methane diamine are heated to about 162° C. and about 2 parts of sodium metal are added as a catalyst. About 3375 parts propylene oxide are added at a guage pressure of from about 5 to about 23 pounds per square inch while maintaining the temperature at from about 100° C. to about 162° C. After no further reaction is visible, the catalyst is neutralized by adding about 5 grams benzoyl chloride thereto. The resulting product has an hydroxyl number of about 398, an acid number of 0.14 and a viscosity at 73° C. of about 2300 centipoises. The product contains about 0.02 percent water.

About 100 parts by weight of the crude product obtained immediately above are mixed with about 62 parts of an 80 percent 2,4-tolylene diisocyanate and 20 percent 2,6-tolylene diisocyanate mixture, about 0.02 part stannous octoate, about 0.2 part 1-methyl-4-dimethyl amino ethyl piperazine, about 20 parts trichlorofluoromethane and about 0.5 part of the siloxane oxylalkylene block copolymer stabilizer having the formula:

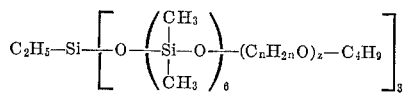

wherein $(C_nH_{2n}O)$ represents about 17 oxyethylene units and about 13 oxypropylene units and the value of $z$ is about 30. The resulting mixture reacts to form a cellular polyurethane plastic having a density of about 2 pounds per cubic foot.

EXAMPLE 2

About 80 parts by weight of the condensate of propylene oxide and 4,4′-diphenyl methane diamine having a molecular weight of about 430 and an hydroxyl number of about 520 and about 20 parts of the condensation product of trimethylolpropane and propylene oxide having a molecular weight of about 420, an hydroxyl number of about 357 and a viscosity of 885 centipoises at 25° C. are mixed together. This mixture is then mixed with about 55 parts 80 percent 2,4-tolylene diisocyanate and 20 percent 2,6-tolylene diisocyanate mixture, about 0.5 part tetramethyl-1,3-butane diamine, about 20 parts trichlorofluoromethane and about 1 part of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam having a density of about 2.3 pounds per cubic foot. The product shrinks less than 10 percent when stored at 95 to 100 percent relative humidity at 70° C. for four weeks.

EXAMPLE 3

About 100 parts by weight of the condensate of propylene oxide and 4,4′-diphenyl methane diamine having a molecular weight of about 430 and an hydroxyl number of about 520 are mixed with about 80 parts of an 80 percent 2,4-tolylene diisocyanate and 20 percent 2,6-tolylene diisocyanate mixture, about 0.2 part stannous oleate, about 0.2 part tetramethyl-1,3-butane diamine, about 50 parts trichlorofluoromethane and about 1.5 parts of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a polyurethane foam having a density of about 0.98 pound per cubic foot and a softening point of about 155° C.

EXAMPLE 4

A polyamine is prepared by adding about 485 parts of aniline (5.2 mols) slowly to a mixture containing about 230 ml. of concentrated hydrochloric acid and about 320 parts of 37 percent formalin (4.03 mols formaldehyde). The temperature of the reaction mixture is kept below about 83° C. by cooling. When all the reactants are added, the solution is gradually heated to about 90° C. and kept at this temperature for about 5½ hours. To neutralize the acid, about 120 parts of sodium hydroxide dissolved in about 555 ml. of water is added. The mixture then separates into two phases and is steam distilled to remove any unreacted aniline. After the water layer is decanted off, the product is washed and dried. The product is a clear amber colored liquid which becomes a sticky solid at room temperature. Analysis shows a yield of 97.5 percent and a neutral equivalent of 107.2. Distillation of the product shows that 27.7 percent by weight distills over the range of about 240° to 245° C. under 10 mm. pressure. This fraction, substantially pure diamine, shows a neutral equivalent of 100.1. The neutral equivalent of the pure diamine is 99. The residue (72.3 percent by weight) shows a neutral equivalent of 109.3. From these analyses it is apparent that here is a mixture of polyamines in which the polyamines higher than the difunctional amine predominate.

The alkylene oxide condensate of the foregoing amine is prepared by heating about 1750 parts of the foregoing amine to a temperature of about 160° C. with about 2 parts of sodium metal as a catalyst. About 3375 parts of propylene oxide are added at a gauge pressure of from about 5 to about 23 parts per square inch while maintaining the temperature at from about 100° to about 160° C. After no further reaction is visible, the catalyst is neutralized by adding about 5 grams of benzoylchloride to the reaction mixture.

A polyurethane reaction mixture is prepared by mixing about 100 parts by weight of the adduct obtained in the foregoing preparation with about 60 parts of a polyisocyanate prepared as follows:

About 345 parts (3.5 mols) of phosgene are dissolved in about 700 ml. of chlorobenzene and chilled to below about 0° C. To this solution is slowly added with stirring a hot solution of about 2,000 ml. of chlorobenzene containing about 270 parts of the aniline-formaldehyde polyamine resin from which the alkylene oxide condensate of this example is prepared. The temperature of the reaction mixture is held below about 30° C. The resin-phosgene complex separates as a yellow solid, making a thick slurry. The reaction mixture is then slowly heated to reflux over a period of about 6½ hours. During this time a slow stream of phosgene is bubbled through the mixture. Refluxing is continued for about 30 minutes after which the phosgene is turned off. Heating is continued for about 30 minutes more to remove the phosgene. The solution is cooled to room temperature and filtered. The filtrate is heated to drive off the solvent leaving a residue of resinous polyisocyanate. The amine equivalent of the product is 136.1. The amine equivalent of the pure diisocyanate is 125.

The polyurethane reaction mixture also contains about 0.2 part of stannous octoate, about 0.2 part of 1-methyl-4-dimethylaminoethyl piperazine, about 20 parts of trichlorofluoromethane and about 0.5 part of the siloxane oxyalkylene block copolymer stabilizer having the formula:

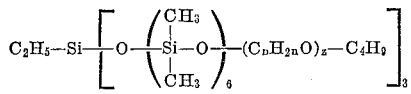

wherein ($C_nH_{2n}O$) represents about 17 oxyethylene units and about 13 oxypropylene units and the value of $z$ is about 30. The mixture reacts to form a rigid cellular polyurethane plastic material having a relatively high degree of flame retardancy and having very good char forming properties.

EXAMPLE 5

About 80 parts of the polyaryl polyamine propylene oxide condensate of Example 4 and about 20 parts by weight of the condensate of trimethylol propane and propylene oxide having a molecular weight of about 420, an hydroxyl number of about 357 and a viscosity of about 885 centipoises at about 25° C. are mixed in an apparatus of the type disclosed in U.S. Pat. Reissue 24,514 with about 20 parts by weight of trichlorofluoromethane, about 48 parts by weight of the isocyanate described in Example 4, about 0.5 part tetramethylbutane diamine and about 1.5 parts of the siloxane oxyalkylene block copolymer having the formula:

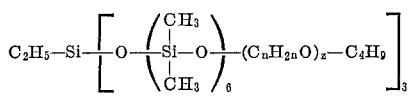

wherein ($C_nH_{2n}O$) represents about 17 oxyethylene units and about 13 oxypropylene units and the value of $z$ is about 30. The isocyanate and other ingredients are injected into a stream of the condensate in the apparatus and a mixing of the components is achieved substantially instantaneously. The reaction mixture is discharged from the apparatus into a cavity where chemical reaction occurs and the reaction mixture expands into a solid porous material which fills the cavity. The resulting rigid polyurethane foam has a relatively high degree of flame resistance and has very good char forming properties.

EXAMPLE 6

About 105 parts by weight of the condensate of 4,4'-diphenylmethane diamine and propylene oxide having an average molecular weight of about 430 and about 35 parts by weight of the condensate of hexanetriol and propylene oxide having a molecular weight of about 700, an hydroxyl number of about 240 and a viscosity of about 375 centipoises at 25° C. are mixed in an apparatus of the type disclosed in U.S. Pat. Reissue 24,514 with about 20 parts by weight trichlorofluoromethane, 75 parts by weight of refined 80 percent 2,4-tolylene diisocyanate and 20 percent 2,6-tolylene diisocyanate mixture (about 99.5% tolylene diisocyanate), about 0.2 part tetramethyl-1,3-butane diamine and about 1.5 parts of the siloxane oxyalkylene block copolymer of Example 1. The diisocyanate and other ingredients are injected into a stream of the condensate in this apparatus and mixing of the components is achieved substantially instantaneously.

After the foregoing have been mixed together to form a liquid reaction mixture which is substantially uniform in composition throughout, the reaction mixture is discharged from the mixing apparatus into a cavity where chemical reaction occurs and the reaction mixture expands into a porous material which fills the cavity and solidifies into a rigid polyurethane foam. When exposed to 100 percent relative humidity at 70° C. for about four weeks, the foam will shrink less than 10 percent in volume.

EXAMPLE 7

About 113 parts by weight of the condensate of 4,4'-diphenylmethane diamine and propylene oxide having a molecular weight of about 430, about 30 parts of the condensate of hexanetriol and propylene oxide having a molecular weight of about 700 and an hydroxyl number of about 240 and a viscosity of about 375 centipoises at 25° C., about 20 parts trichlorofluoromethane, about 78 parts of an 80 percent 2,4-tolylene diisocyanate and 20 percent 2,6-tolylene diisocyanate mixture, about 0.005 part stannous octoate, about 0.1 part tetramethyl-1,3-butane diamine, and about 1.5 parts of the siloxane oxyalkylene block copolymer of Example 1 are mixed together substantially simultaneously in an apparatus of the type described in U.S. Pat. Reissue 24,514. As soon as the components have been mixed into a reaction mixture of substantially uniform composition, the reaction mixture is discharged from the mixing apparatus into a suitable mold where chemical reaction occurs with the formation of a rigid polyurethane foam. This product fills the mold upon chemical reaction with accompanying expansion and is a solid rigid foam which will shrink less than 10 percent in volume when exposed to a relative humidity of 95 percent to 100 percent at 70° C. for four weeks.

EXAMPLE 8

About 97 parts by weight of the condensate of 4,4'-diphenyl methane diamine and propylene oxide having a molecular weight of about 430, about 40 parts of the condensate of hexanetriol and propylene oxide having a molecular weight of about 700, a viscosity of about 375 centipoises at 25° C., and an hydroxyl number of about 240 are mixed together and the resulting mixture is mixed with about 72 parts by weight of an 80 percent 2,4-tolylene diisocyanate and 20 percent 2,6-tolylene diisocyanate mixture, about 20 parts trichlorofluoromethane, about 0.1 part stannous oleate, about 0.1 part tetramethyl-1,3-butane diamine and about 1.5 parts of the siloxane oxyalkylene block copolymer of Example 1 in an apparatus of the type described in U.S. Pat. Reissue 24,514. The resulting mixture is discharged into a suitable mold where chemical reaction occurs and a solidified rigid foam is obtained.

EXAMPLE 9

About 97 parts by weight of the condensate of propylene oxide and 4,4'-diphenylmethane diamine having a molecular weight of about 430 and about 40 parts of the condensation product of trimethylolpropane and propylene oxide having a molecular weight of about 420, and hydroxyl number of about 357 and a viscosity of 885 centipoises at 25° C. are mixed together. This mixture is then mixed with about 105 parts of an 80 percent 2,4-tolylene diisocyanate and 20 percent 2,6-tolylene diisocyanate mixture, about 0.05 part stannous octoate, about 0.1 part tetramethyl-1,3-butane diamine, about 2.9 parts water and about 1.5 parts of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam.

EXAMPLE 10

About 80 parts by weight of the condensate of propylene oxide and 4,4'-diphenylmethane diamine having a molecular weight of about 430 and about 50 parts of the condensation product of hexanetriol and propylene oxide having a molecular weight of about 700, an hydroxyl number of about 240 and a viscosity of 375 centipoises at 25° C. are mixed together. This mixture is then mixed with about 101 parts of an 80 percent 2,4-tolylene diisocyanate and 20 percent 2,6-tolylene diisocyanate mixture, about 0.1 part stannous oleate, about 0.2 part tetramethyl-1,3-butane diamine, about 4 parts water and about 1.5 parts of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam.

EXAMPLE 11

About 90 parts by weight of the condensate of propylene oxide and 4,4'-diphenylmethane diamine having a molecular weight of about 430 and about 45 parts of the condensation product of hexanetriol and propylene oxide having a molecular weight of about 700, an hydroxyl number of about 240 and a viscosity of 375 centipoises at 25° C. are mixed together. This mixture is then mixed with about 71 parts of an 80 percent 2,4-tolylene diisocyanate and 20 percent 2,6-tolylene diisocyanate mixture, about 0.1 part stannous oleate, about 0.2 part tetramethyl-1,3-butane diamine, about 20 parts trichlorofluoromethane and about 1.5 parts of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a closed cell rigid polyurethane foam.

EXAMPLE 12

About 97 parts by weight of the condensate of propylene oxide and 4,4'-diphenylmethane diamine having a molecular weight of about 430 and about 40 parts of the condensation product of trimethylolpropane and propylene oxide having a molecular weight of about 1535, an hydroxyl number of about 110 and a viscosity of 360 centipoises at 25° C. are mixed together. This mixture is then mixed with about 66 parts of an 80 percent 2,4-tolylene diisocyanate and 20 percent 2,6-tolylene diisocyanate mixture, about 0.1 part dibutyl tin dilaurate, about 0.2 part 1-methyl-4-dimethyl amino ethyl piperazine, about 20 parts trichlorofluoromethane and about 0.5 part of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a closed cell rigid polyurethane foam.

EXAMPLE 13

About 80 parts by weight of the condensate of propylene oxide and tolylene diamine having a molecular weight of about 430 and about 50 parts of the condensation product of sorbitol and propylene oxide having a molecular weight of about 1340, an hydroxyl number of about 286 and a viscosity of 1388 centipoises at 25° C. are mixed together. This mixture is then mixed with about 65 parts of an 80 percent 2,4-tolylene diisocyanate and 20 percent 2,6-tolylene diisocyanate mixture, about 0.6 part tetramethyl-1,3-butane diamine, about 20 parts trichlorofluoromethane and about 1 part of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a polyurethane foam.

EXAMPLE 14

About 97 parts by weight of the condensate of propylene oxide and 4,4'-diphenylmethane diamine having a molecular weight of about 430 and about 40 parts of the condensation product of hexanetriol and propylene oxide having a molecular weight of about 700, an hydroxyl number of about 240 and a viscosity of 375 centipoises at 25° C. are mixed together. This mixture is then mixed with about 76 parts of a crude 80 percent 2,4-tolylene diisocyanate and 20 percent 2,6-tolylene diisocyanate mixture having an assay of 91 percent tolylene diisocyanate, about 0.25 part stannous oleate, about 20 parts trichlorofluoromethane and about 1 part of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam.

EXAMPLE 15

About 115 parts by weight of the condensate of propylene oxide and 4,4'-diphenylmethane diamine having a molecular weight of about 430 and about 35 parts of the condensation product of trimethylpropane and propylene oxide having a molecular weight of about 730, an hydroxyl number of about 230 and a viscosity of 412 centipoises at 25° C. are mixed together. This mixture is then mixed with about 118 parts of a crude 4,4'-diphenyl methane diisocyanate mixture containing 31.5 percent —NCO, about 0.05 part stannous oleate, about 0.3 part tetramethyl-1,3-butane diamine, about 25 parts trichlorofluoromethane and about 0.5 part of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam.

EXAMPLE 16

About 97 parts by weight of the condensate of propylene oxide and 4,4'-diphenylmethane diamine having a molecular weight of about 430 and about 40 parts of the condensation product of glycerine and propylene oxide having a molecular weight of about 650, an hydroxyl number of about 236 and a viscosity of 250 centipoises at 25° C. are mixed together. This mixture is then mixed with about 72 parts of an 80 percent 2,4-tolylene diisocyanate and 20 percent 2,6-tolylene diisocyanate mixture, about 0.05 part stannous oleate, about 20 parts trichlorofluoromethane, and about 1.5 parts of the siloxane oxyalkylene block copolymer of Example 1 in an apparatus of the type described in U.S. Pat. Reissue 24,514. After a uniform mixture is obtained, the liquid is discharged from the mixing apparatus into a suitable mold where chemical reaction occurs with the formation of a rigid polyurethane foam.

EXAMPLE 17

About 3240 parts of 4,4'-diphenylmethane diamine are heated to about 160° C. and about 2 parts of sodium metal are added thereto. While rapidly stirring the 4,4'-diphenylmethane diamine, propylene oxide under a pressure of about one atmosphere gauge is added until a total of about 3170 parts by weight propylene oxide have been added while cooling the mixture to maintain a temperature of 160° C. or lower. When reaction has substantially subsided, about 5.1 parts benzoyl chloride are added and reacted with the sodium catalyst. The contents of the reaction vessel are then cooled to room temperature.

About 160 parts by weight of the product of the foregoing reaction without purification are mixed with about 62 parts by weight of a mixture of 80 percent 2,4-tolylene diisocyanate and 20 percent 2,6-tolylene diisocyanate, about 0.02 part stannous octoate, about 0.2 part 1-methyl-4-dimethyl amino ethyl piperazine, about 20 parts trichlorofluoromethane and about 0.5 part of the siloxane oxyalkylene block copolymer used in Example 1 above. After a substantially uniform mixture is obtained, the reaction mixture is placed in a suitable container where reaction proceeds with foaming and expansion of the reaction mixture into a cellular polyurethane plastic.

EXAMPLE 18

About 160 parts by weight of a 4,4'-diphenylmethane diamine-propylene oxide condensate are mixed with about 62 parts by weight of an 80 percent 2,4-tolylene diisocyanate and 20 percent 2,6-tolylene diisocyanate mixture, about 0.02 part stannous octoate, about 0.2 part 1-methyl-4-dimethyl amino ethyl piperazine, about 20 parts trichlorofluoromethane and about 0.5 part of the siloxane oxyalkylene block copolymer of Example 1. The components of the reaction mixture react upon mixing to form a solidified cellular polyurethane plastic.

It is to be understood that any of the other resinous materials may be used in the foregoing examples and the condensate of polyamine with alkylene oxide can be a condensate of any of the other aromatic polyamines having all of the hydrogen atoms on the diamine substituted by a hydroxyalkyl radical derived through condensation with an alkylene oxide. Any other polyisocyanates can be substituted for the ones set forth in the foregoing examples. Likewise, other catalysts or no catalysts at all can be used. Although best results are obtained when a siloxane oxyalkylene block copolymer is used as a stabilizer, it is possible to omit the stabilizer or use any other suitable substitute.

Although the invention has been described in considerable detail for the purpose of illustration, it is to be understood that variations may be made therein by those skilled in the art without departing from the spirit of the invention and the scope of the claims.

What is claimed is:
1. A polyurethane foam prepared by a process which comprises reacting an organic polyisocyanate in the presence of a blowing agent with an adduct which is the reaction product of one mol of an alkylene oxide having from two to five carbon atoms with each amino hydrogen atom of a compound having the formula

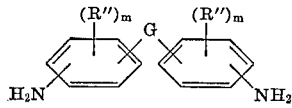

and mixtures thereof, wherein R" is a halogen atom, an alkyl radical having from one to four carbon atoms or an alkoxy radical having from one to four carbon atoms; G is an alkylene radical having from one to three carbon atoms and $m$ is an integer of from 0 to 4.

2. The polyurethane foam of claim 1 wherein a second organic compound having at least two groups which are reactive with isocyanate groups as determined by the Zerewitinoff method is also reacted with the organic polyisocyanate.

3. The polyurethane foam of claim 2 wherein the second organic compound has a molecular weight of from about 100 to about 1500, an hydroxyl number of from about 75 to about 1700 and a viscosity at 25° C. of from about 100 centipoises to about 5000 centipoises.

4. The polyurethane foam of claim 2 wherein from about 90 to about 50 parts by weight of the adduct and about 10 to about 50 parts by weight of the second organic compound are reacted with the organic polyisocyanate.

5. The polyurethane foam of claim 2 wherein the viscosity of the adduct and the second organic compound is not more than about 75,000 centipoises at 25° C.

6. The polyurethane foam of claim 1 wherein the adduct has the formula

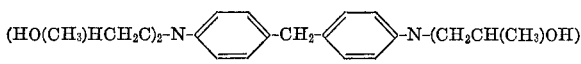

References Cited

UNITED STATES PATENTS

| | | | |
|---|---|---|---|
| 3,014,894 | 12/1961 | Mueller et al. | 260—75 |
| 3,423,344 | 1/1969 | Odinak et al. | 260—2.5 |

FOREIGN PATENTS

| | | | |
|---|---|---|---|
| 972,772 | 10/1964 | Great Britain | 260—2.5UX |

OTHER REFERENCES

Condensed Chemical Dictionary, Fifth Edition, Reinhold, New York (1956), pp. 881–882.

DONALD E. CZAJA, Primary Examiner

H. S. COCKERAM, Assistant Examiner

U.S. Cl. X.R.

260—18TN, 67TN, DIG24, 77.5AP